United States Patent [19]

Demmering

[11] 3,907,802

[45] Sept. 23, 1975

[54] PROCESSES FOR PREPARATION AND USE OF N-ALKYLPIPERAZINES

[75] Inventor: Gunther Demmering, Solingen-Grafrath, Germany

[73] Assignee: Henkel & Cie GmbH, Dusseldorf, Germany

[22] Filed: Mar. 29, 1974

[21] Appl. No.: 456,034

[30] Foreign Application Priority Data
Apr. 2, 1973 Germany............................ 2316358
June 7, 1973 Germany............................ 2329057

[52] U.S. Cl.............................. 260/268 SY; 424/250
[51] Int. Cl.² ....................................... C07D 295/02
[58] Field of Search............................... 260/268 SY

[56] References Cited
UNITED STATES PATENTS
3,647,795  3/1972  Bluestein et al. .............. 260/268 SY
3,780,040  12/1973  Schnettler...................... 260/256.5

Primary Examiner—R. J. Gallagher
Assistant Examiner—Jose Tovar
Attorney, Agent, or Firm—Hammond & Littell

[57] ABSTRACT

A process is provided for preparing mono- and dialkylated piperazines, especially those with a relatively long-chain alkyl attached to the nitrogen. These mono- and dialkylated piperazines and their acid addition salts are useful as antimicrobial agents against gram-positive bacteria, gram-negative bacteria and fungi.

10 Claims, No Drawings

PROCESSES FOR PREPARATION AND USE OF N-ALKYLPIPERAZINES

THE PRIOR ART

The preparation of N-alkyl-piperazines by aminolysis of N-alkyl-alkanolamines in the presence of Raney nickel and excess hydrogen is known. This reaction, however, is not suitable to the preparation of N-alkyl-piperazines which contain a relatively long alkyl residue or a cyclohexyl residue (cf. Chem. Abstracts, Vol. 53, 7191 c).

OBJECTS OF THE INVENTION

It is an object of the present invention to provide a process for the preparation of generally monoalkylated piperazines, especially those with a relatively long alkyl chain attached to the nitrogen.

It is another object of the present invention to provide a process for preparing monoalkylated and dialkylated piperazines by reacting N-alkylated diethanolamines with at least 3 mols of ammonia or methylamine per mol of alkyldiethanolamine at temperatures above 150°C in the presence of hydrogenation catalysts consisting of chromium oxide-zinc oxide and/or aluminum oxide-zinc oxide and excess hydrogen.

It is a further object of the present invention to provide a process for the prevention of the growth of microorganisms comprising contacting said microorganisms with an amount effective to prevent the growth of said microorganisms of a piperazine having at least one long-chain alkyl attached to a nitrogen, or an acid addition salt of said piperazine.

These and other objects will become apparent from the following description of the invention.

DESCRIPTION OF THE INVENTION

The present invention relates to a process for the preparation of generally monoalkylated piperazines, especially those with a relatively long alkyl chain attached to the nitrogen.

According to the present invention, N-alkylated diethanolamines are treated with at least 3 mols of ammonia or methylamine per mol of alkyl-diethanolamine at temperatures above 150°C in the presence of known hydrogenation catalysts consisting of chromium oxide-zinc oxide and/or aluminum oxide-zinc oxide and excess hydrogen. Ammonia and methylamine behave similarly in the process according to the invention.

More particularly the present invention provides a process for the preparation of a piperazine having at least one long-chain alkyl attached to a nitrogen, of the formula

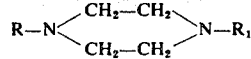

wherein R is selected from the group consisting of alkyl having 8 to 22 carbon atoms and cycloalkyl having 6 to 10 carbon atoms, and $R_1$ is selected from the group consisting of hydrogen and methyl, by catalytic aminolysis of N-alkylated diethanolamine, comprising reacting an N-alkyl-diethanolamine of the formula

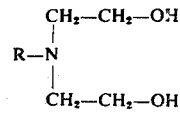

wherein R has the same meanings as defined above, with at least 3 moles of the reactant $NH_2-R_1$ wherein $R_1$ has the same meanings as defined above, per mol of said N-alkyl-diethanolamine at a temperature above 150°C in the presence of excess hydrogen and in the presence of a catalytic amount of a hydrogenation catalyst selected from the group consisting of chromium oxide-zinc oxide, aluminum oxide-zinc oxide and the mixtures thereof, and recovering said piperazine having at least one long-chain alkyl attached to a nitrogen.

In addition, the present invention provides a process for the prevention of the growth of microorganisms selected from the group consisting of gram-positive bacteria, gramnegative bacteria and fungi which consists essentially of contacting said microorganisms with an amount effective to prevent the growth of said microorganisms of a compound selected from the group consisting of (A) a piperazine having at least one long-chain alkyl attached to a nitrogen, of the formula

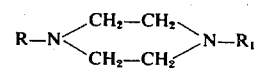

wherein R is selected from the group consisting of alkyl having 8 to 22 carbon atoms and cycloalkyl having 6 to 10 carbon atoms, and $R_1$ is selected from the group consisting of hydrogen and methyl, (B) an acid addition salt of said piperazine of (A) and (C) the mixtures of (A) and (B).

The present invention also provides an antimicrobial composition for preventing the growth of microorganisms selected from the group consisting of gram-positive bacteria, gramnegative bacteria and fungi consisting of an inert carrier and an amount effective to prevent the growth of said microorganisms of the above-defined compound.

Suitable starting materials used in the process according to the invention are N-alkyl-diethanolamines, which have been prepared in a known manner by reacting one mol of alkylamine with 2 mols of ethylene oxide. This reaction is known and may be readily carried out at elevated temperatures and pressures with or without catalysts. The starting materials are alkylamines such as those prepared by hydrogenation under pressure, of the corresponding nitriles. Suitable amines are, for example, alkylamines having 8 to 22 carbon atoms, preferably 8 to 18 carbon atoms and especially 10 to 16 carbon atoms, such as octylamine, decylamine, laurylamine, tetradecylamine, and stearylamine. Further examples of suitable amines include cycloalkylamines of 6 to 10 carbon atoms, preferably 6 carbon atoms, such as cyclohexylamine. The alkyl radical may be branched-chain, but it should not contain substituents which are not inert under the reaction conditions.

The preparation of the chromium oxide-zinc oxide or aluminum oxide-zinc oxide catalysts to be used is effected in a known manner. Powdered oxides of the selected metals are made into a paste in a suitable way and are made into tablets possibly with addition of further adjuvants such as graphite, or the like. These tablets are introduced into the reaction vessel before carrying out the reaction and reduced at elevated temperature in an atmosphere of hydrogen.

The reaction according to the invention is carried out at a superatmospheric hydrogen pressure of at least 50 atm. The upper limit of the pressure is not restricted, but in practice is dictated by the known apparatus. The preferred pressure range is from 50 to 400 atm, especially 100 to 300 atm. The reaction is carried out at temperatures from 200°C to 350°C, especially from 270°C to 320°C. If hydrogen is replaced by nitrogen, the reaction according to the invention does not take place and a plurality of reaction products is obtained. N-alkyl-piperazines are formed in very low yields only as by-products.

An excess of ammonia or methylamine, which should amount to about 3 to 30 mols of ammonia, or of methylamine, per mol of N-alkyl-diethanolamine, is essential for carrying out the reaction. In general, good results are obtained with an excess of from 5 to 20 mols of ammonia, or methylamine, and a relatively high excess of ammonia or methylamine is favorable to the yield.

The usual apparatus for high-pressure hydrogenation is usually utilized for carrying out the reaction. The working up of the reaction product is effected by distillation, suitably under reduced pressure. Piperazines and free alkylamines are formed as by products, especially at higher temperatures. The N-alkylamine, after reaction with 2 mol of ethylene oxide, can be used again in the reaction.

The N-alkylpiperazines or N-alkyl-N'-methylpiperazines previously obtained only with difficulty, have surface-active properties when utilized in the form of their salts. Their antimicrobial activity, preferably when utilized in the form of their salts, preferably the acid addition salts, is of special importance. N-alkyl-piperazines or N-alkyl-N'-methylpiperazines are produced in which the alkyl substituent has 8 to 22 carbon atoms, preferably 10 to 18 carbon atoms and especially 10 to 16 carbon atoms, or in which the alkyl is cycloalkyl having 6 to 10 carbon atoms, preferably 6 carbon atoms. Preferred are those compounds in which the alkyl substituent on the piperazine ring is lauryl, tetradecyl, stearyl or is the cycloalkyl substituent cyclohexyl.

The amount of antimicrobial agent effective to prevent the growth of microorganisms such as gram-positive bacteria, gram-negative bacteria and fungi ranges from 0.5 to 50 mgm of the agent per liter of liquid to be treated, such as industrial water, and preferably ranging from 1 to 10 mgm of agent/liter of liquid. The amount of antimicrobial agent required for inhibiting the growth of microorganisms varies from 0.1 to 500 parts per million. These agents may be used in antimicrobial agent compositions ranging from 0.1% to 10% by weight, preferably 0.5% to 5% by weight and especially from k0.1% to 2% by weight.

The piperazine compounds produced by the method according to the invention may be converted into their water-soluble acid addition salts with inorganic or organic acids, such as hydrobromic acid, sulfuric acid, maleic acid, oxalic acid, acetic acid, and hydrochloric acid, by known methods. A preferred acid addition salt is the dihydrochloride salt.

The following examples are merely illustrative of the present invention without being deemed limitative in any manner thereof.

EXAMPLES

EXAMPLE 1

Preparation of the Catalyst a. Chromium oxide-zinc oxide catalyst 1 kilomol of powdered zinc oxide and 0.6 kilomol of chromium trioxide were mixed with sufficient water in a kneader to give a stiff paste. This was dried at 80°C, ground, and after mixing with 3% by weight of graphite, based upon the dry mixture, was pressed into tablets of 6mm diameter.

b. Zinc oxide-aluminum oxide catalyst 1 kilomol of powdered zinz-oxide was mixed with a suspension of freshly precipitated aluminum hydroxide, this suspension containing 0.6 kilomol of aluminum. The paste formed was dried at 80°C, then finely ground and, after intermixing with 3% by weight of graphite, based upon the dry substance, was pressed into tablets.

EXAMPLE 2

Preparation of the N-alkyl-piperazines

The reaction was carried out in a continuously operating apparatus, such as is used for high-pressure hydrogenation. It consisted of a 14-liter capacity reactor, hydrogen heater, heat exchanger, separating flasks, circulating pumps and metering pumps for the reactants. 12 liters of the respective hydrogenation catalyst described above under (a) and (b) of Example 1 were placed in the reactor. The reaction was carried out continuously with a feed flow rate of 0.5 liter/hr of reaction mixture.

The reaction mixture obtained was worked up by distillation.

In the first column of Table I below is shown the catalyst used, and the molar amounts of ammonia, based upon 1 mol of N-alkyl-diethanolamine, as well as the reaction temperature and hydrogen pressure in the reaction vessel follow. Then the alkyl residue attached to the nitrogen of the piperazine obtained is stated as well as the yield and the boiling point of the N-alkyl-piperazine.

TABLE I

| Catalyst | Mol NH$_3$ | Reaction temp.°C | H$_2$-pressure atm. | Alkyl residue | Yield in % | Boiling point °C/mmHg |
|---|---|---|---|---|---|---|
| a | 8 | 300 | 250 | lauryl | 70 | 115–117/0.3 |
| a | 16 | 295 | 250 | lauryl | 81 | 115–117/0.3 |
| a | 20 | 300 | 250 | tetradecyl | 79 | 141–144/0.03 |
| a | 15 | 285 | 250 | cyclohexyl | 82 | 122–124/11 |
| a | 15 | 300 | 250 | methyl | 73 | 136–137/760 |
| b | 15 | 280 | 250 | lauryl | 70 | 110–112/0.2 |

EXAMPLE 3

Preparation of the N-lauryl-N'-methylpiperazine

The reaction was carried out in a continuously operating apparatus such as is used for high-pressure hydrogenation. It consisted of a 14 liter capacity reactor, hydrogen heater, heat exchanger, separating flasks, circulating pumps and metering pumps for N-diethanol-laurylamine and methylamine. 12 liters of the hydrogenation catalyst a) described above in Example 1 were placed in the reactor. With a feed flow rate of 1 liter/hour the reaction was carried out continuously and the reaction mixture obtained was worked up by distillation. The reaction conditions were: equal volumes of N-diethanolamine and methylamine. Pressure: 250 atm. hydrogen. Temperature: 295°C in the reactor. Yield based upon the diethanol-laurylamine:

58% N-lauryl-N'-methylpiperazine Boiling point at 0.05 mm Hg was 130°–135°C, $n_D^{20} = 1.4657$
7% piperazine
24% laurylamine The remainder was a mixture of preliminary constituents in the first distillate and residue.

EXAMPLE 4

Determination of the Antimicrobial Activity

The antimicrobial activity of mono-N-laurylpiperazine and mono-N-laurylpiperazine dihydrochloride were determined by measuring the inhibiting effect on the following test organisms:

(1) Staphylococcus aureus    $5 \times 10^7$ organisms per ml
(2) Escherichia coli         $4 \times 10^7$ organisms per ml
(3) Pseudomonas aeruginosa   $4 \times 10^7$ organisms per ml
(4) Candida albicans         $2 \times 10^6$ organisms per ml The inhibiting concentrations of the individual substances were determined using the so-called "plate test". This test constitutes a modified form of the dilution test for determining the microbiostatic effect as described in the method for testing chemical disinfectants by the German Society for Hygiene and Microbiology (1959), under the methods of preliminary evaluations of such materials, and can be used to advantage in different tests not utilizing the liquid nutrient media stated in the said directives. The advantage of solid nutrient media is obvious, particularly when testing the efficacy of substances with respect to fungi.

The desired test concentrations were produced by mixing measured quantities of solutions of suitable concentrations of the test substances with measured quantities of liquified broth-agar or beer wort-agar in sterile Petri dishes. Merck Standard I broth-agar or wort-agar (8° Bg) was always used. The quantities of the substance solutions measured by means of a pipette were 0.1 ml up to a maximum of 1 ml and the total volume in the Petri dishes amounted to 10 ml after mixing with the nutrient medium. After the nutrient medium had solidified, the surface was injected with the test suspension of organisms in broth or wort which contained the above-mentioned concentration of organisms per ml. Incubation was effected for 8 days at 37°C for bacteria and was effected for 8 days at 30°C for fungi in an incubator. Subsequently it was determined which substance concentration incorporated in the nutrient medium could fully inhibit the growth of the organisms. The value thus determined was designated the "minium inhibiting concentration" (m.i.c.). The tests were carried out in the following intervals of concentration: 2500 ppm, 1000 ppm, 750 ppm, 500 ppm, 250 ppm, 100 ppm, 50 ppm, 25 ppm and 10 ppm.

The results are compiled below in Table II.

TABLE II

Inhibiting concentration of the compounds in ppm
Test Organism used

| Compound | Staph. aureus | E. coli | Ps. aeruginosa | Candida albicans |
|---|---|---|---|---|
| Mono-N-lauryl-piperazine | 10 | 10 | 100 | 50 |
| Mono-N-lauryl-piperazine-dihydrochloride | 10 | 10 | 100 | 75 |

EXAMPLE 5

Utilizing a procedure analogous to that described in Example 4, the antimicrobial activity of N-lauryl-N'-methylpiperazine was determined by measuring the inhibiting effect on the following test organisms:

(1) Staphylococcus aureus    $5 \times 10^7$ organisms per ml
(2) Escherichia coli         $4 \times 10^7$ organisms per ml
(3) Pseudomonas aeruginosa   $4 \times 10^7$ organisms per ml
(4) Candida albicans         $2 \times 10^6$ organisms per ml The experiments were carried out in the following concentration intervals: 2500 ppm, 1000 ppm, 750 ppm, 500 ppm, 250 ppm, 100 ppm, 50 ppm, 25 ppm and 10 ppm. The following inhibiting concentrations were found:

Staphylococcus aureus     10 ppm
Escherichia coli          10 ppm
Pseudomonas aeruginosa   500 ppm
Candida albicans          50 ppm

EXAMPLE 6

The antimicrobial activity of the mono-N-alkylpiperazines was determined by means of the suspension test. The procedure for this testing method is described in the method for the testing of chemical disinfectants published by the German Society for Hygiene and Microbiology (1959), under the methods of preliminary evaluations of such materials. According to these procedures 0.1 ml test organism suspension of the following bacteria and fungi were pipetted into test tubes at a temperature of 18°C to 21°C.

(1) Staphylococcus aureus    $5 \times 10^7$ organisms per ml
(2) Escherichia coli         $4 \times 10^7$ organisms per ml
(3) Pseudomonas aeruginosa   $4 \times 10^7$ organisms per ml
(4) Candida albicans         $2 \times 10^6$ organisms per ml Each 0.1 ml portion of the above test organism suspensions was diluted to 10 ml, with an unbuffered tap water solution containing the products of the invention to be tested. The concentrations of the products according to the invention were 100 ppm, 250 ppm and 500 ppm. After reaction times of 1, 2.5, 5, 10, 20, 30, 60 and 120 minutes a dropper-full of material was taken from the test tubes and pipetted into 10 ml nutrient solution. The nutrient solutions inoculated with bacteria were incubated at 37°C, while those inoculated with Candida albicans were incubated at 30°C, in an incubator. After 6 days the cultures were evaluated macroscopically for growth of the test organisms; and the sterilization times were then determined. The results are compiled in Table III.

TABLE III

Sterilization times of the products according to the invention with regard to the various test organisms, in minutes:
(Tests in unbuffered aqueous solution)

| Concentration of the products | Staph aureus | Esch. Coli | Ps. aeruginosa | Cand. albicans |
|---|---|---|---|---|
| 100 ppm)Lauryl- | 5 | 10 | 10 | 2.5 |
| 250 ppm)piperazine | < 2.5 | 5 | 10 | 2.5 |
| 500 ppm) | < 2.5 | 5 | 10 | 2.5 |
| 100 ppm)Lauryl- | 2.5 | 2.5 | 2.5 | 5 |
| 250 ppm)piperazine | 2.5 | 2.5 | 2.5 | 5 |
| 500 ppm)2HCl | 2.5 | 2.5 | 2.5 | 5 |
| 100 ppm)Tetradecyl- | < 2.5 | 120 | 40 | 5 |
| 250 ppm)piperazine | < 2.5 | 120 | 20 | 2.5 |

EXAMPLE 7

Utilizing a procedure analogous to the described in Example 6, 0.1 ml of suspensions of the test organisms of bacteria and fungi mentioned below were pipetted into test tubes at a temperature of 18°C to 21°C.

| | |
|---|---|
| (1) Staphylococcus aureus | $5 \times 10^7$ organisms per ml |
| (2) Escherichia coli | $4 \times 10^7$ organisms per ml |
| (3) Pseudomonas aeruginosa | $4 \times 10^7$ organisms per ml |
| (4) Candida albicans | $2 \times 10^6$ organisms per ml |

Each 0.1 ml portion of the above test organisms suspensions was diluted to 10 ml with a tap water soution containing the products of the invention to be tested. The concentrations of the products of the invention were 100 ppm and 250 ppm. After reaction times of 1, 2.5, 5, 10, 20, 30, 60 and 120 minutes, a dropper-full of material was taken from each of the test tubes and pipetted in 10 ml of nutrient solution. The nutrient solutions inoculated with bacteria were incubated at 37°C, and those inoculated with Candida albicans were incubated at 30°C in an incubator. After 6 days the cultures were evaluated macroscopically for growth of the test organisms; and the sterilization times were then determined. The results are compiled in Table 4.

TABLE IV

Sterilization times of the products according to the invention with regard to various test organisms, in minutes:

| Concentration of N-lauryl- piperazine | Staph. aureus | Escherichia coli | Pseudomonas aeruginosa | Candida albicans |
|---|---|---|---|---|
| 250 ppm | 2.5 | 5 | 20 | 2.5 |
| 100 ppm | 2.5 | 5 | 20 | 5 |

The advantages of the present invention include providing a process for preparing N-alkyl-piperazines having a long chain alkyl residue or a cyclohexyl attached to the nitrogen atom. Furthermore the above-described antimicrobial properties of the compounds according to the invention provide a very rapid degradation of the growth of the microorganisms treated with these compounds in very low dosages.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. A process for the preparation of a piperazine having at least one long-chain alkyl attached to a nitrogen, of the formula

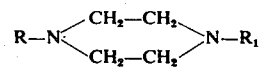

wherein R is selected from the group consisting of alkyl having 8 to 22 carbon atoms and cycloalkyl having 6 to 10 carbon atoms, and $R_1$ is selected from the group consisting of hydrogen and methyl, by catalytic aminolysis of N-alkyl-ated-diethanolamine, comprising the steps of reacting an N-alkyl-diethanolamine of the formula

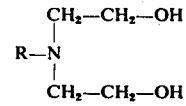

wherein R has the same meanings as defined above, with at least 3 moles of the reactant $NH_2\text{-}R_1$ wherein $R_1$ has the same meanings as defined above, per mol of said N-alkyl-diethanolamine at a temperature above 150°C in the presence of hydrogen at superatmospheric pressure and in the presence of a catalytic amount of a hydrogenation catalyst selected from the group consisting of chromium oxide-zinc oxide, aluminum oxide-zinc oxide and the mixtures thereof; and recovering said piperazine having at least one long-chain alkyl attached to a nitrogen.

2. The process of claim 1, in which said reaction is conducted at a hydrogen pressure of 50 to 400 atmospheres and at a temperature of 200°C to 350°C.

3. The process of claim 1, in which said reaction is conducted at a hydrogen pressure of 100 to 300 atmospheres and at a temperature of 270°C to 320°C.

4. The process of claim 1, in which said reaction is conducted with 3 to 30 mols of said reactant $NH_2$-$R_1$ per mol of N-alkyl-diethanolamine.

5. The process of claim 1, in which said reaction is conducted with 5 to 20 mols of said reactant $NH_2$-$R_1$ per mol of N-alkyl-diethanolamine.

6. The process of claim 1, in which $R_1$ is hydrogen.

7. The process of claim 1, in which said $R_1$ is methyl.

8. The process of claim 1, in which R is alkyl having 8 to 18 carbon atoms.

9. The process of claim 8, in which R is alkyl having 10 to 16 carbon atoms.

10. The process of claim 1, in which R is selected from the group consisting of lauryl, tetradecyl, stearyl and cyclohexyl.

* * * * *